US011833998B2

United States Patent
Burke et al.

(10) Patent No.: US 11,833,998 B2
(45) Date of Patent: Dec. 5, 2023

(54) VEHICLE AND PORTABLE DEVICE OPERATION

(71) Applicant: Ford Global Technologies, LLC, Dearborn, MI (US)

(72) Inventors: Ryan Burke, Palo Alto, CA (US); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 17/177,497

(22) Filed: Feb. 17, 2021

(65) Prior Publication Data

US 2022/0258692 A1    Aug. 18, 2022

(51) Int. Cl.
*B60R 25/24*  (2013.01)
*G06N 20/00*  (2019.01)
*B60R 25/01*  (2013.01)
*B60R 25/31*  (2013.01)
*B60R 25/34*  (2013.01)
*G06N 5/04*  (2023.01)

(52) U.S. Cl.
CPC .............. *B60R 25/24* (2013.01); *B60R 25/01* (2013.01); *B60R 25/31* (2013.01); *B60R 25/34* (2013.01); *G06N 5/04* (2013.01); *G06N 20/00* (2019.01)

(58) Field of Classification Search
CPC ......... B60R 25/24; B60R 25/01; B60R 25/31; B60R 25/34; G06N 20/00; G06N 25/04
See application file for complete search history.

(56) References Cited

U.S. PATENT DOCUMENTS

| | | | |
|---|---|---|---|
| 2015/0261304 A1* | 9/2015 | Kamisawa | E05F 15/77 340/5.28 |
| 2018/0265039 A1* | 9/2018 | Jain | B60R 25/31 |
| 2019/0297457 A1* | 9/2019 | Ledvina | G07C 9/29 |
| 2020/0186970 A1* | 6/2020 | Dekovich | B60R 25/245 |
| 2020/0196098 A1 | 6/2020 | Smith et al. | |
| 2022/0161760 A1* | 5/2022 | Moeller | G08B 21/182 |
| 2022/0172622 A1* | 6/2022 | Bakhishev | G06V 20/52 |

\* cited by examiner

*Primary Examiner* — Peter D Nolan
*Assistant Examiner* — Mikko Okechukwu Obioha
(74) *Attorney, Agent, or Firm* — Frank Lollo; Bejin Bieneman PLC (57) ABSTRACT

A computer includes a processor and a memory, the memory storing instructions executable by the processor to input a signal received from a portable device to a machine learning program trained to output a location of the portable device relative to a vehicle, collect operating data of one or more vehicle components, predict an action of a vehicle user based on the predicted location, and, based on the predicted action of the vehicle user, actuate one or more vehicle components. The machine learning program is trained with a training dataset that is updatable to include the signal, the output predicted location, the collected operating data, the predicted action, and an identified action performed by the vehicle user.

20 Claims, 6 Drawing Sheets

VEHICLE AND PORTABLE DEVICE OPERATION

BACKGROUND

Vehicles can have components actuatable by a user in possession of a portable device, e.g., a fob or the like. For example, a vehicle can include door locks for vehicle doors actuatable when the user and the portable device are within a specified distance threshold of the vehicle. The door locks can secure the vehicle doors to a vehicle frame, preventing unauthorized access to the vehicle. When the portable device is proximate to the vehicle, it can be used to allow a user to perform actions such as locking and/or unlocking vehicle doors.

DETAILED DESCRIPTION

A system includes a computer including a processor and a memory, the memory storing instructions executable by the processor to input a signal received from a portable device to a machine learning program trained to output a location of the portable device relative to a vehicle, collect operating data of one or more vehicle components, predict an action of a vehicle user based on the predicted location, and, based on the predicted action of the vehicle user, actuate one or more vehicle components. The machine learning program is trained with a training dataset that is updatable to include the signal, the output predicted location, the collected operating data, the predicted action, and an identified action performed by the vehicle user.

The action performed by the vehicle user can be one of an entry into the vehicle, an exit from the vehicle, or an initiation of a propulsion.

The instructions can further include instructions to identify the action performed by the vehicle user based on data collected from the component actuated by the vehicle user.

The instructions can further include instructions to collect the operating data from at least one of a vehicle door or a vehicle seat.

The instructions can further include instructions to actuate at least one of a seat weight sensor or a door position sensor to collect the operating data.

The instructions can further include instructions to identify the location of the portable device as one of a driver entry zone, a passenger entry zone, a vehicle interior, or a rear entry zone.

The instructions can further include instructions to actuate one or more of the vehicle components to receive input from the vehicle user.

The instructions can further include instructions to unlock a vehicle door lock when the predicted action is an entry into the vehicle.

The instructions can further include instructions to annotate the signal with a label including the identified location of the portable device.

The instructions can further include instructions to input a respective signal strength of a signal sent from the portable device to each of a plurality of receivers to the machine learning program to predict the location of the portable device.

The instructions can further include instructions to collect operating data for each of a plurality of components and to identify the action performed by the vehicle user based on the data from each of the plurality of components.

The instructions can further include instructions to retrain the machine learning program with the updated training dataset.

A method includes inputting a signal received from a portable device to a machine learning program trained to output a location of the portable device relative to a vehicle, collecting operating data of one or more vehicle components, predicting an action of a vehicle user based on the predicted location, and, based on the predicted action of the vehicle user, actuating one or more vehicle components. The machine learning program is trained with a training dataset that is updatable to include the signal, the output predicted location, the collected operating data, the predicted action, and an identified action performed by the vehicle user.

The method can further include identifying the action performed by the vehicle user based on data collected from the component actuated by the vehicle user.

The method can further include collecting the operating data from at least one of a vehicle door or a vehicle seat.

The method can further include actuating at least one of a seat weight sensor or a door position sensor to collect the operating data.

The method can further include identifying the location of the portable device as one of a driver entry zone, a passenger entry zone, a vehicle interior, or a rear entry zone.

The method can further include actuating one or more of the vehicle components to receive input from the vehicle user.

The method can further include unlocking a vehicle door lock when the predicted action is an entry into the vehicle.

The method can further include annotating the signal with a label including the identified location of the portable device.

The method can further include inputting a respective signal strength of a signal sent from the portable device to each of a plurality of receivers to the machine learning program to predict the location of the portable device.

The method can further include collecting operating data for each of a plurality of components and identifying the action performed by the vehicle user based on the data from each of the plurality of components.

The method can further include retraining the machine learning program with the updated training dataset.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Vehicles can include features to actuate components that would typically be actuated with a key, such as unlocking a door or actuating a vehicle propulsion, based on a proximity of a user to the vehicle. Instead of a physical key, the vehicle can detect the presence of a transmitter, such as a key fob, and actuate the components based on the location of the key fob that would typically be actuated with the key. For example, when the transmitter is proximate to a driver door, the vehicle can detect the presence of the transmitter in a detection zone around the driver door and actuate a door lock upon receiving input to the driver door. Rather than using the fob, the user can have a portable device, such as a smartphone, that can communicate with the vehicle to actuate the components instead of the key fob. A computer in the vehicle can determine the location of the portable device relative to the vehicle and actuate components based on the determined location.

The computer can use a localization program to determine the location of the portable device. The localization program can be a machine learning program that receives a signal sent from the portable device as input and outputs a predicted location of the portable device. The localization program can identify a zone, i.e., an area in or around the vehicle, in which the portable device is predicted to be located. Upon identifying the location, the computer can actuate one or more components based on the location. For example, if the location is a driver entry zone, the computer can actuate a lock on a driver door to an unlocked position. The localization program can be initially trained with a reference data set including ground truth reference data, and when the vehicle is in use, the computer may not have access to the reference data set to retrain the localization program.

Upon identifying the location and predicting the user action, the computer can collect operating data from one or more components. Based on the operating data, the computer can determine the actual action that the user performed. For example, the computer can collect operating data from the lock of the driver door to determine whether the user actuated the driver door to the unlocked position. Based on the actual user action, the computer can determine whether the localization model correctly identified the location of the portable device. The computer can include the predicted location, the predicted user action, and the actual user action in a training dataset and can retrain the localization program with the updated training dataset. The inclusion in the training dataset of predicted locations, predicted user actions, and actual user actions while the vehicle is in use, is a "weak supervised learning" technique to refine the localization program. Using weak supervised learning allows the computer to refine the localization program without additional reference data because the computer generates additional data to add to the training dataset based on actual user interactions. Thus, the compute refines the localization program with new ground truth data, improving the precision with which the localization program can predict the location of the portable device from input of a new signal.

Figure 1:
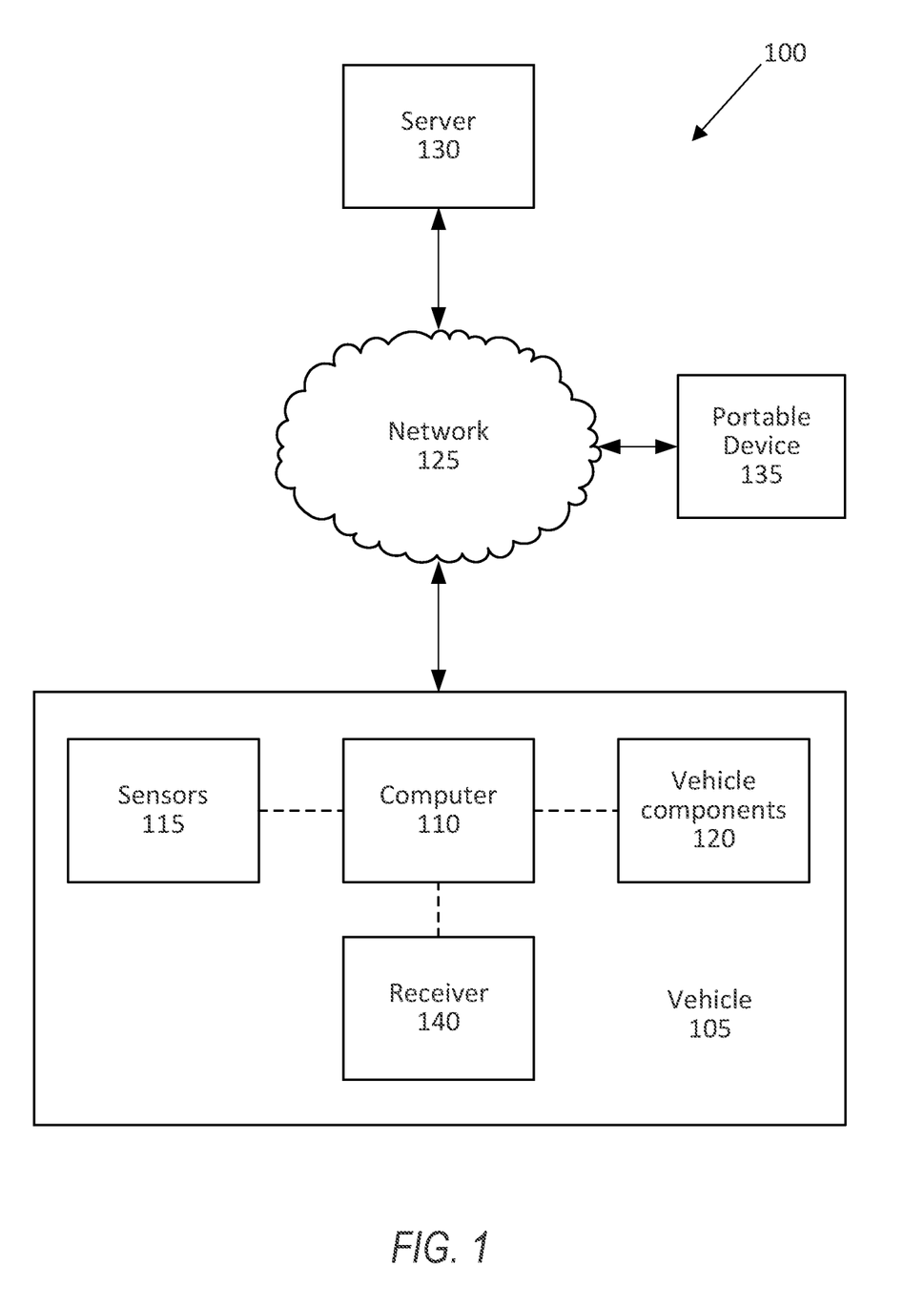
FIG. 1 is a block diagram of an example system for identifying a location of a portable device.

FIG. 1 illustrates an example system 100 for operating a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit signals to various devices in a vehicle 105 and/or receive signals from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

A vehicle 105 can operate in one of a fully autonomous mode, a semiautonomous mode, or a non-autonomous mode. A fully autonomous mode is defined as one in which each of vehicle 105 propulsion (typically via a powertrain including an electric motor and/or internal combustion engine), braking, and steering are controlled by the computer 110. A semi-autonomous mode is one in which at least one of vehicle 105 propulsion (typically via a powertrain including an electric motor and/or internal combustion engine), braking, and steering are controlled at least partly by the computer 110 as opposed to a human operator. In a non-autonomous mode, i.e., a manual mode, the vehicle 105 propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 includes a portable device 135. The portable device 135 may be any one of a variety of devices, such as computing devices including a processor and a memory, that have communication capabilities to communicate over the network 125. For example, the portable device 135 may be a wearable device, e.g. a watch or a smart watch, a smartphone, a tablet, a personal digital assistant, a watch-phone pairing, a vibrating apparatus, etc. that includes capabilities for wireless communications using IEEE 802.11, Bluetooth®, UWB, NFC, Bluetooth® Low Energy (BLE), and/or cellular communications protocols. Further, the portable device 135 may use such communications capabilities to communicate directly with a vehicle computer 110, e.g., using Bluetooth®.

The vehicle 105 includes one or more receivers 140. The receivers 140 receive radio frequency (RF) signals from the portable device 135 via the wireless communication protocol. For example, the receivers 140 can include conventional devices that include radio circuitry and/or elements for receiving radio signals such as antennas that receive RF signals from the portable device 135, e.g., BLE signals. The receivers 140 can be located at specified locations on the vehicle 105 to receive signals from the portable device 135 at different locations relative to the vehicle 105. For example, the vehicle 105 can include a first receiver 140 at a front of the vehicle 105 and a second receiver 140 at a rear of the vehicle 105.

Figure 2:
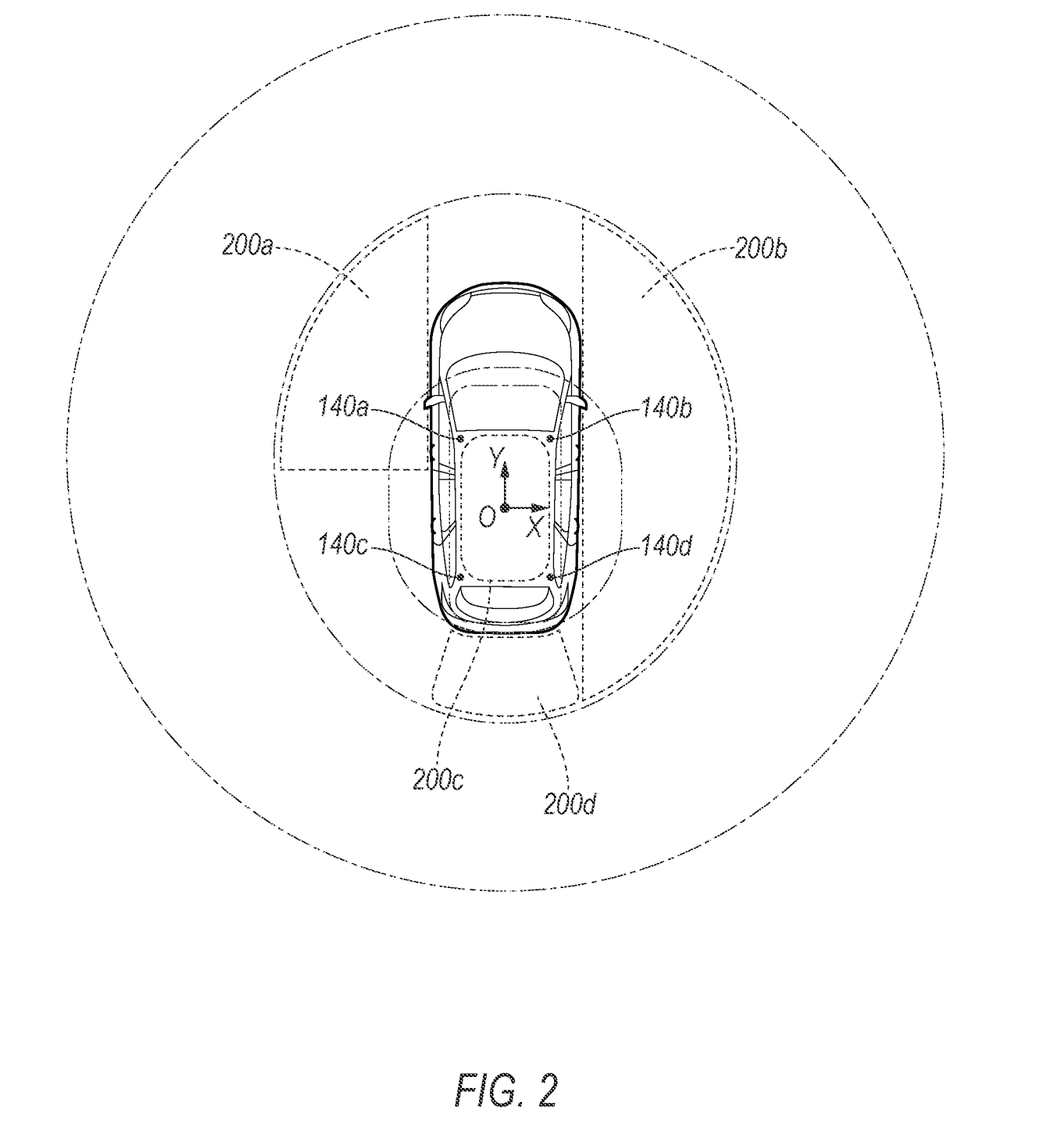
FIG. 2 is a top-down view of the vehicle.

FIG. 2 is a top-down view of a vehicle 105 and an area around the vehicle 105. The computer 110 can define a two-dimensional rectangular coordinate system. The coordinate system defines a lateral direction X, a longitudinal direction Y, and an origin O at a center point of the vehicle 105. The longitudinal direction Y is a vehicle-forward direction, i.e., the direction in which a propulsion 120 moves the vehicle 105 when a steering component 120 is in a neutral position. The lateral direction X is perpendicular to the longitudinal direction Y.

The computer 110 can define a plurality of detection zones 200 around the vehicle 105. A "detection zone" is a set of coordinates in the coordinate system associated to one or more vehicle components 120 and/or component actuation. That is, each detection zone 200 can be described as a set of x, y coordinate pairs in the coordinate system. FIG. 2 illustrates four detection zones, a driver entry zone 200a, a passenger entry zone 200b, a vehicle interior 200c, and a rear entry zone 200d (collectively, detection zones 200).

The portable device 135 can transmit a signal to the computer 110 via the network 125. For example, the portable device 135 can transmit an RF signal, e.g., including a BLE message, as described above. The receivers 140 can receive the signal and transfer data transmitted via the signal to the computer 110. That is, when the signal from the portable device 135 is transmitted, the signal induces a voltage in each of the receivers 140 based on the frequencies of the signal. The computer 110 can "receive" the signal by receiving the voltages induced in the receivers. The vehicle 105 of FIG. 2 includes four receivers 140a, 140b, 140c, 140d.

The computer 110 can "localize" the portable device 135 based on the message received from the portable device 135. To "localize" the portable device 135 in the context of this disclosure means to determine the location of the portable device 135 relative to the vehicle 105, e.g., to identify a detection zone 200 in which the portable device 135 is located. The computer 110 can localize the portable device 135 based on the message received by the receivers 140. Upon receiving the message from the portable device 135, each receiver 140 can determine the signal strength of the message. A "signal strength" is a measure of transmitter power output from the portable device 135 to transmit the message to the receiver 140, and is typically measured in decibels (dB) or decibels relative to a milliwatt (dBm). Each receiver 140 can determine the respective signal strength of the message sent from the portable device 135 based on the signal power induced in the receiver 140 by the message. For example, when the portable device 135 is in the driver entry zone 200a, a signal strength of the receiver 140a can be greater than a signal strength of the receiver 140d because the receiver 140a is closer to the portable device 135 than the receiver 140d is, and an RF signal attenuates based on the distance between the transmitter and the receiver.

Figure 4:
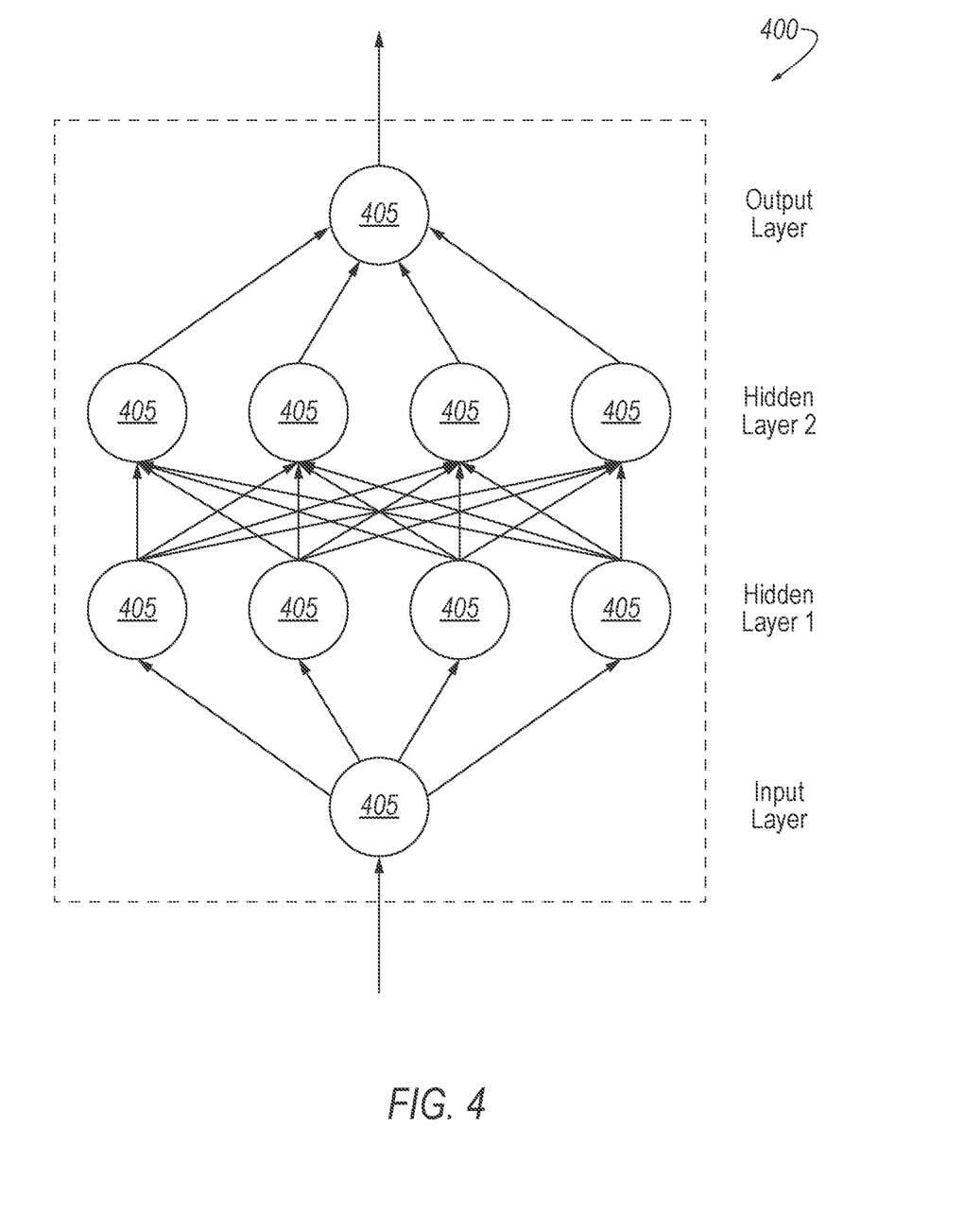
FIG. 4 is a block diagram of an example neural network.

The computer 110 can input the signal strengths of the receivers 140 and the message to a machine learning program, as described below, to determine the location of the portable device 135. The machine learning program can receive the signal strengths and the message as input and can apply one or more weights to the signal strengths and the message to output a detection zone 200 in which the portable device 135 is predicted to be located. For example, the machine learning program can be a neural network, as shown in FIG. 4.

The computer 110 can collect operating data of one or more components 120. In this context, "operating data" are data describing a parameter of operation of the component 120. Example operating data include, e.g., a weight on a vehicle seat, an angle of a vehicle door relative to a neutral position, an activation status of a propulsion, a lock status of a vehicle door lock, etc. The computer 110 can collect the operating data from one or more sensors 115, e.g., a door position sensor, a seat weight sensor, etc. For example, the sensors 115 can transmit the operating data to the computer 110 and/or other components 120 via a CAN bus.

Based on the detection zone 200 in which the portable device 135 is located, the computer 110 can predict an action of the vehicle user. The "action" of the vehicle user is an actuation of one or more components 120 caused by the user. Example actions include, e.g., unlocking a vehicle door lock, initiating a vehicle propulsion, opening a rear trunk door, entering the vehicle, exiting the vehicle, etc. Each detection zone 200 can have specific actions associated to the detection zone, each associated action based on possible actions that can be performed by the user in the detection zone 200. The computer 110 predicts the action of the vehicle user by identifying the actions that are associated to the detection zone 200. For example, in the driver entry zone 200a, the actions can include unlocking the driver's side door and actuating the propulsion. In another example, in the rear entry zone 200d, the actions can include unlocking the rear trunk door. Example actions associated to each zone are listed in Table 1 below:

TABLE 1

User Actions

| Detection Zone | User Actions |
| --- | --- |
| Driver entry | Unlock driver door |
| Passenger entry | Unlock passenger door |
| Vehicle interior | Actuate propulsion |
| Rear entry | Unlock trunk door, open trunk door |

Based on the operating data, the computer 110 can determine the actual action performed by the user. To identify the actual action performed by the vehicle user, the computer 110 can collect operating data from the components 120, as described above, via a vehicle network such as a CAN bus. The computer 110 can determine the action based on the collected data. For example, when the door position for a vehicle door exceeds a predetermined threshold, the computer 110 can determine that the actual action was entry into the vehicle 105. In another example, when the activation status of the propulsion is "activated," the computer 110 can determine that the actual action was activating the propulsion. In another example, when a switch between a trunk door and a vehicle body is deactivated, the computer 110 can determine that the trunk door is open and that the actual action was opening the trunk door.

To determine whether the computer 110 correctly predicted the detection zone 200, the computer 110 can compare the predicted detection zone 200 to the actual user action determined based on the operating data. That is, the computer 110 predicts the user action based on the predicted detection zone 200 and then determines the actual user action based on the operating data, and the computer 110 compares the predicted user action to the actual user action to determine whether the computer 110 correctly predicted the detection zone 200. When the actual user action is one of the actions associated to the predicted detection zone 200, the computer 110 can determine that the machine learning program correctly predicted the detection zone 200. When the actual user action is not one of the actions associated to the predicted detection zone 200, the computer 110 can determine that the machine learning program did not correctly predict the detection zone 200. Based on the correctness of the prediction of the detection zone 200, the computer 110 can refine the machine learning program, as described below, to improve accuracy of predicting the location of the portable device 135.

Figure 3:
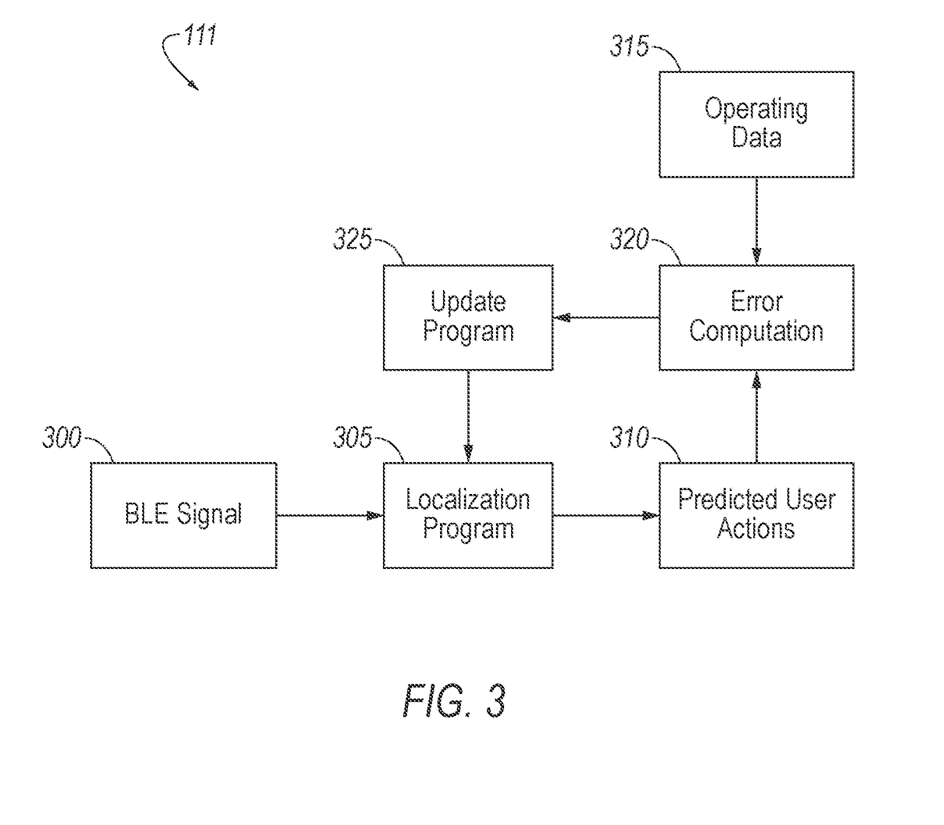
FIG. 3 is a block diagram of a vehicle computer identifying the location of the portable device.

FIG. 3 is a block diagram illustrating a program flow 111 for the computer 110 to predict the detection zone 200 in which the portable device 135 is located and predicting the user action. The receivers 140 can receive a signal 300 from the portable device 135. The signal 300 can be sent via, e.g., a BLE protocol. The computer 110 can receive the message from the receivers 140 via a vehicle network such as a CAN bus.

The computer 110 can input the message to a localization program 305 to localize the portable device 135. The computer 110 can localize the portable device 135 based on respective signal strengths of the message received by the receivers 140, as described above. The localization program 305 is a machine learning program that can be trained to output a predicted detection zone 200 in which the portable device 135 is located. The localization program 305 can be a neural network, as described below and shown in FIG. 4.

The computer 110 can predict one or more user actions based on the output detection zone 200, represented by the block 310. As described above, each detection zone 200 can have one or more user actions associated to the detection zone, shown in Table 1, each action including actuation of one or more components 120. Upon predicting the detection zone 200, the computer 110 can actuate the components 120 for to perform one the one or more user actions upon receiving user input. For example, the computer 110 can actuate a lock on a driver door when a user provides input to a driver door handle to an unlocked position, unlocking the driver door for the user. Because the computer 110 predicted that the portable device 135 is in the driver entry zone 200a, the computer 110 can unlock the driver door upon receiving user input and can prevent unlocking of other vehicle doors. That is, in the present example, the computer 110 can unlock the driver door without input from the user to a key fob because the portable device 135 is predicted to be in the driver entry zone 200a and the computer 110 correctly predicted the user action to be entry into the vehicle 105 via the driver door.

The computer 110 can receive operating data from one or more components 120 via the vehicle network such as a CAN bus, represented by block 315. The components 120 can collect the operating data with one or more sensors 115, and the components 120 can transmit the operating data to one or more other components 120 and/or the computer 110 via the vehicle network. The computer 110 can collect operating data from components 120 associated to the identified detection zone 200, as described above. Based on the operating data, as described above, the computer 110 can determine an actual action performed by the user. For example, when the door position for a vehicle door exceeds a predetermined threshold, the computer 110 can determine that the actual action was entry into the vehicle 105. In another example, when the activation status of the propulsion is "activated," the computer 110 can determine that the actual action was activating the propulsion.

The computer 110 can determine an "error" from the predicted detection zone 200, i.e., the computer determines whether the localization program 305 correctly predicted the detection zone 200 in which the portable device 135 was located, as represented by block 320. The computer 110 compares the output detection zone 200 to the actual user action determined based on the operating data. The computer 110 can determine the detection zone 200 associated to the actual user action and compare the determined detection zone 200 to the output detection zone 200. The computer 110 can generate an error value that is a number between 0 and 1 that indicates a probability that the localization program 305 correctly predicted the detection zone 200. The computer 110 can determine the error as a probability P that the output detection zone E correctly predicted the detection zone 205 in which the user performed one or more actions determined by operating data and previously collected BLE signals C, e.g., with a Bayesian expression:

$$P(E \mid C) = \frac{P(C \mid E) \cdot P(E)}{P(C \mid E) \cdot P(E) + P(C \mid \hat{E}) \cdot P(\hat{E})} \quad (1)$$

where P(E|C) is the error, i.e., the probability that, based on the operating data, the user is in the detection zone 200 identified by the localization program 305, P (C|E) is the probability that, based on the output detection zone 200, the user is about to perform an action associated to the detection zone 200, P(E) is the probability that the user is in the detection zone 200 based on the BLE signal (i.e., the value output from the localization program 305), P(C|Ê) is the probability that, based on the output detection zone 200, the user is about to perform an action associated to a different detection zone 200 than the detection zone 200 output by the localization program 305, and P(Ê) is a probability that the user is not in the detection zone 200 based on the BLE signal 300. The probabilities P(C|E), P(C|Ê) can be predetermined values stored in a memory of the computer 110 and determined based on empirical testing of portable devices 135 and test vehicles 105. The probability P(Ê) can be determined as 1−P(E), i.e., the probabilities that localization program 305 correctly identified the detection zone 200 equal 1.

When the error P(E|C) is below a predetermined threshold, the computer 110 can retrain the localization program 305, represented by block 325. The threshold for the error can be determined based on empirical testing of portable devices 135 and/or key fobs communicating BLE signals 300 to test vehicles 105. For example, the empirical testing can compare prediction of a detection zone 200 of a test vehicle 105 from a BLE signal 300 from a portable device 135 to a detection of a detection zone 200 from a signal from a key fob. The testing can determine a percentage value of success of detecting the key fob in the detection zone 200 of the test vehicle 105, e.g., 95%. The error threshold for the localization program 205 can be the percentage value of success of the key fob, i.e., the error threshold can be determined such that the identification of the detection zone 200 by the localization program is at least as correct as identification of the detection zone 200 with the key fob.

Because the computer 110 may not have access to the initial reference data set used to train the localization program 305, the computer 110 can use data collected while the vehicle is in use to retrain the localization program 305. The computer 110 can update a training dataset with the signal, the output detection zone 200, the predicted user action, the operating data, the actual user action, and the error. The computer 110 can retrain the localization program 305 with the updated training dataset, such as the training described below and shown in FIG. 4. Thus, by updating the training dataset and retraining the localization program 305 while the computer 110 receives signals from the portable device 135 in use, the computer 110 can refine the localization program 305 while the vehicle 105 is used by the user. This "weak supervised learning" technique improve the dataset used to train the localization program 305 with actual use of the vehicle 105 and the portable device 135 by the user.

FIG. 4 is a diagram of an example deep neural network (DNN) 400 that can be trained to determine a detection zone 200 in which a portable device 135 is located based on an input RF signal such as a signal 300 from the portable device 135. The DNN 400 can be a software program that can be loaded in memory and executed by a processor included in a computer, for example. In an example implementation, the DNN 400 can include, but is not limited to, a convolutional neural network (CNN), R-CNN (Region-based CNN), Fast R-CNN, and Faster R-CNN. The DNN includes multiple nodes, and the nodes are arranged so that the DNN 400 includes an input layer, one or more hidden layers, and an output layer. Each layer of the DNN 400 can include a plurality of nodes 405. While FIG. 4 illustrate three hidden layers, it is understood that the DNN 400 can include additional or fewer hidden layers. The input and output layers may also include more than one node 405.

The nodes 405 are sometimes referred to as artificial neurons 405, because they are designed to emulate biological, e.g., human, neurons. A set of inputs (represented by the arrows) to each neuron 405 are each multiplied by respective weights. The weighted inputs can then be summed in an input function to provide, possibly adjusted by a bias, a net input. The net input can then be provided to an activation function, which in turn provides a connected neuron 405 an output. The activation function can be a variety of suitable functions, typically selected based on empirical analysis. As illustrated by the arrows in FIG. 4, neuron 405 outputs can then be provided for inclusion in a set of inputs to one or more neurons 405 in a next layer.

As one example, the DNN 400 can be trained with ground truth data, i.e., data about a real-world condition or state. Weights can be initialized by using a Gaussian distribution, for example, and a bias for each node 405 can be set to zero. Training the DNN 400 can include updating weights and biases via suitable techniques such as back-propagation with optimizations. Ground truth data used for training can include, but is not limited to, data specifying a location of the portable device 135 relative to the vehicle 105, data specifying respective signal strengths of a signal 300 received by the receivers 140, etc.

The computer 110 obtains a signal 300 from the portable device 135. The computer 110 can provide the signal strength data of the signal 300 from the receivers 140 to the DNN 400. The DNN 400 generates an output based on the received input. The output is a predicted detection zone 200 in which the portable device 135 is located.

Figure 5:
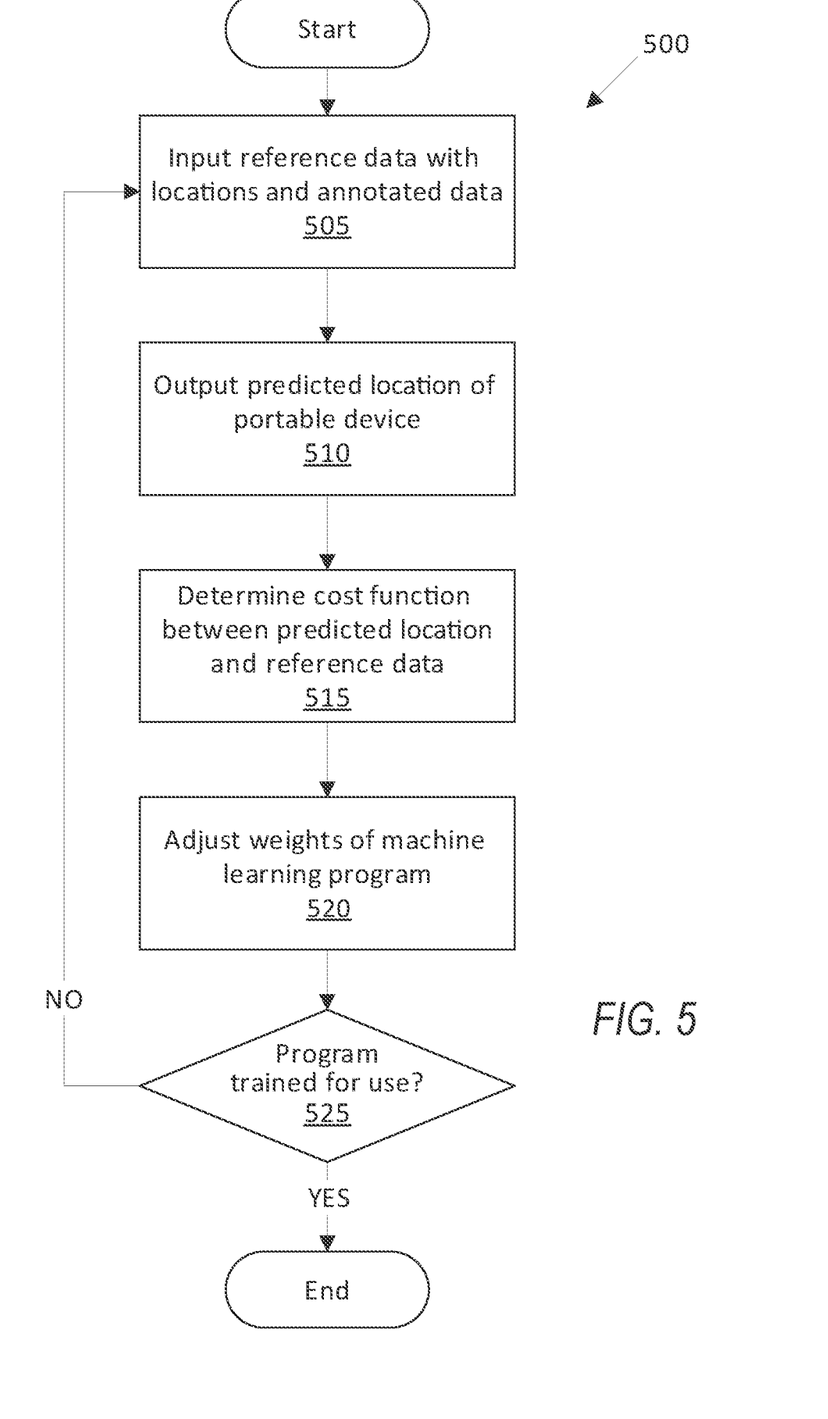
FIG. 5 is a block diagram of an example process for training a machine learning program.

FIG. 5 is a block diagram of an example process 500 for training a localization program 305. The process 500 begins in a block 505, in which a computer 110 and/or a server 130 inputs reference data with annotated locations to the localization program 305. The reference data can be, e.g., reference RF signals (e.g., BLE signals 300) transmitted by a portable device 135 at a specified location with specified signal strengths based on the specified location. The signals 300 can each include an annotation (e.g., an object label) identifying a detection zone 200 from which the portable device 135 transmitted the signal 300.

Next, in a block 510, the localization program 305 outputs a predicted location of the portable device 135. The localization program 305 localizes the portable device 135, i.e., outputs a prediction of the detection zone 200 in which the portable device 135 is located. As described above, the localization program 305 can be a neural network 400 that outputs the predicted detection zone 200 based on weights and biases of one or more nodes 405 applied to the input reference data.

Next, in a block 515, the computer 110 and/or the server 130 determines a cost function between the predicted detection zone 200 output from the localization program 305 and the reference data. As described above, the computer 110 and/or the server 130 can identify a difference in data values output from the localization program 305 and the annotations of the reference signals 300 as the cost function.

Next, in a block 520, the computer 110 and/or the server 130 adjusts one or more weights of the localization program 305 to minimize the cost function. For example, as described above, the computer 110 and/or the server 130 can adjust one or more weights and/or biases of one or more nodes 405 of the neural network 400. The computer 110 and/or the server 130 can adjust the weights to reduce the output of the cost function.

Next, in a block 525, the computer 110 and/or the server 130 determines whether the localization program 305 is trained with sufficient confidence for use in the vehicle 105. For example, the computer 110 and/or the server 130 can determine that the localization program 305 is trained with sufficient confidence when output of the cost function is below a threshold when the cost function is minimized. The threshold can be determined by a manufacturer training the localization program 305, e.g., based on a conventional statistical benchmark such as a 95% confidence interval. That is, the cost function outputs a scalar number indicating a difference between output of the localization program 305 and the ground truth label of the reference data, and the computer 110 and/or the server 130 can normalize the output scalar number to a number between 0 and 1 based on the ground truth label. When the normalized scalar number is less than 0.05, the computer 110 and/or the server 130 can determine that the localization program 305 is sufficiently trained with sufficient confidence for use in the vehicle 105. In another example, the computer 110 and/or the server 130 can determine that the localization program 305 is not trained with sufficient confidence for use in the vehicle 105 when the output of the cost function is above the threshold when the cost function is minimized. If the computer 110 and/or the server 130 determines that the localization program 305 is trained with sufficient confidence, the process 500 ends. Otherwise, the process 500 returns to the block 505.

Figure 6:
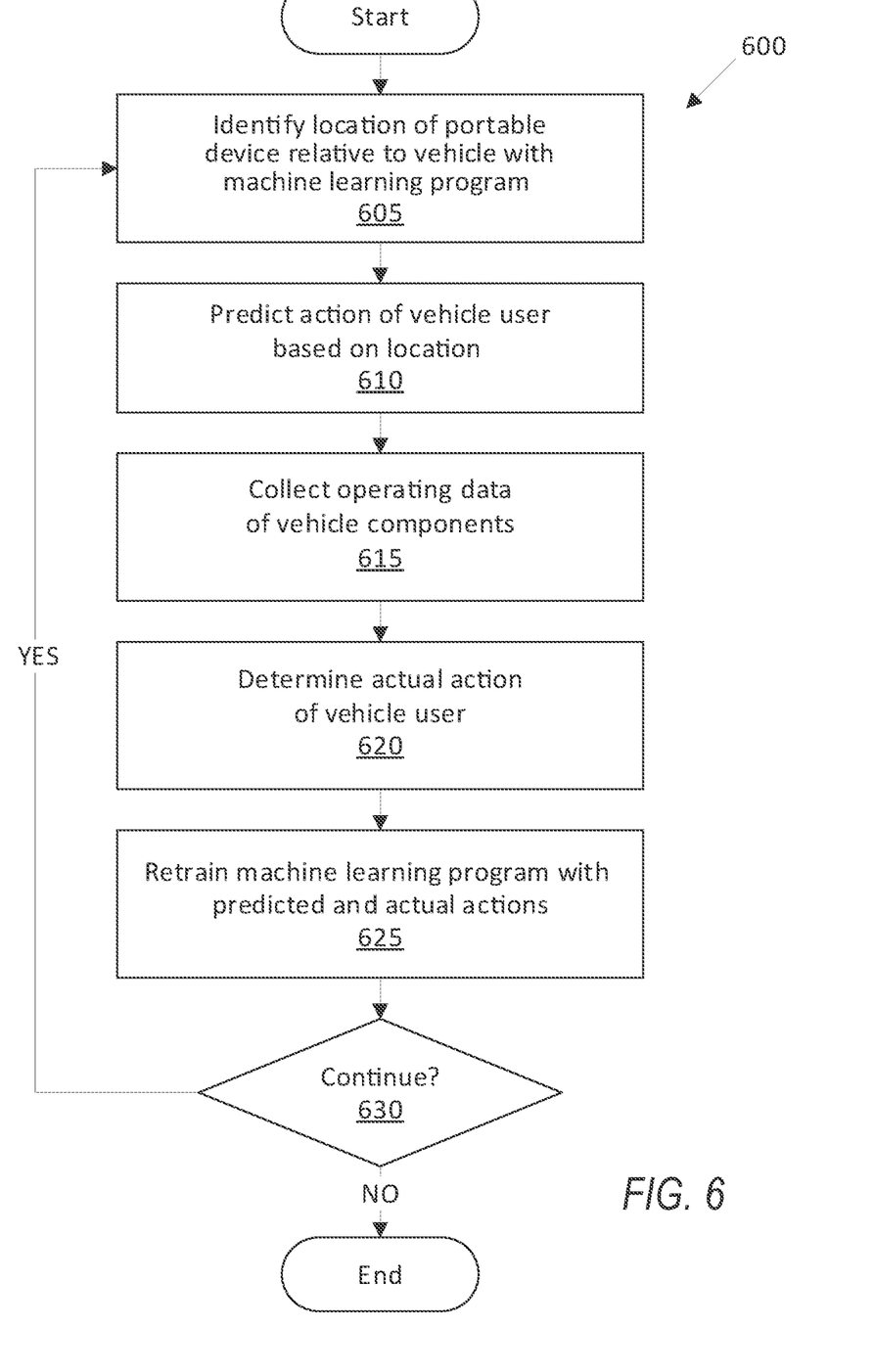
FIG. 6 is a block diagram of an example process for identifying the location of the portable device.

FIG. 6 is a block diagram of an example process 600 for detecting a location of a portable device 135 relative to a vehicle 105, actuating a vehicle component 120 based on the detected location, and retraining a localization program 305 based on the detected location. The process 600 begins in a block 605, in which a computer 110 outputs a predicted location of the portable device 135 from a localization program 305 trained according to the process 500 shown in FIG. 5. As described above, the computer 110 can input signal strengths of a BLE signal 300 to the localization program 305, and the localization program 305 can output a predicted detection zone 200 as the predicted location in which the portable device 135 was located upon sending the signal.

Next, in a block 610, the computer 110 predicts one or more actions of a vehicle user based on the predicted location (e.g., the predicted detection zone 200) of the portable device 135. As described above, each detection zone 200 has one or more user actions associated to the detection zone 200, such as shown in Table 1, and the computer 110 identifies the one or more actions as predicted actions of the vehicle user based on an identified detection zone 200. For example, if the predicted detection zone is a driver entry zone 200a, the computer 110 can predict the user actions to be entry into the vehicle 105 and actuating a propulsion.

Next, in a block 615, the computer 110 collects operating data from one or more vehicle components 120. As described above, "operating data" are data describing a parameter of operation of the component 120. One or more sensors 115 can collect the operating data, and the computer 110 can collect the operating data from the components 120 via a vehicle network, e.g., a CAN bus. Example operating data include, e.g., a weight on a vehicle seat, an angle of a vehicle door relative to a neutral position, an activation status of a propulsion, a lock status of a vehicle door lock, etc.

Next, in a block 620, the computer 110 determines an actual action of the vehicle user based on the operating data. The operating data can indicate the action that the user actually performed. For example, if door angle data of a driver door exceed a threshold, the computer 110 can determine that the user action was entry into the vehicle 105 (i.e., the user opened the driver door to enter the vehicle 105). In another example, if seat weight data exceed a threshold and a propulsion activation status is "activated," the computer 110 can determine that the user was in the vehicle interior detection zone 200c and the user action was activating the propulsion.

Next, in a block 625, the computer 110 retrains the localization program 305 with the predicted user actions and the actual user action. As described above, the computer 110 can detect errors between the predicted user actions and the actual user action to determine whether the localization program 305 correctly predicted the detection zone 200. The computer 110 can generate a training dataset with the predicted detection zone 200, the predicted user actions, and the actual user action. The computer 110 can retrain the localization program 305 with the training dataset, e.g., according to the process 500 described above with the training dataset as the reference data used in the block 505. Retraining the localization program 305 with additional data can refine the localization program 305 and improve accuracy of predicting the detection zone 200 from which the portable device 135 sends the signal 300.

Next, in a block 630, the computer 110 determines whether to continue the process 600. For example, the computer 110 can determine not to continue the process 600 when the propulsion is activated and the vehicle 105 is moving. If the computer 110 determines to continue, the process 600 returns to the block 605. Otherwise, the process 600 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising a computer including a processor and a memory, the memory storing instructions executable by the processor to:
   input a signal received from a portable device to a machine learning program trained to output a predicted location of the portable device relative to a vehicle;
   collect operating data of one or more vehicle components;
   predict an action of a vehicle user based on the predicted location; and
   based on the predicted action of the vehicle user, actuate one or more vehicle components;
   wherein the machine learning program is trained with a training dataset that is updatable to include the signal, the output predicted location, the collected operating data, the predicted action, and an identified action performed by the vehicle user.

2. The system of claim 1, wherein the action performed by the vehicle user is one of an entry into the vehicle, an exit from the vehicle, or an initiation of a propulsion.

3. The system of claim 2, wherein the instructions further include instructions to identify the action performed by the vehicle user based on data collected from the component actuated by the vehicle user.

4. The system of claim 1, wherein the instructions further include instructions to collect the operating data from at least one of a vehicle door or a vehicle seat.

5. The system of claim 4, wherein the instructions further include instructions to actuate at least one of a seat weight sensor or a door position sensor to collect the operating data.

6. The system of claim 1, wherein the instructions further include instructions to identify the location of the portable device as one of a driver entry zone, a passenger entry zone, a vehicle interior, or a rear entry zone.

7. The system of claim 1, wherein the instructions further include instructions to actuate one or more of the vehicle components to receive input from the vehicle user.

8. The system of claim 7, wherein the instructions further include instructions to unlock a vehicle door lock when the predicted action is an entry into the vehicle.

9. The system of claim 1, wherein the instructions further include instructions to annotate the signal with a label including the output predicted location of the portable device.

10. The system of claim 1, wherein the instructions further include instructions to input a respective signal strength of a signal sent from the portable device to each of a plurality of receivers to the machine learning program to predict the location of the portable device.

11. The system of claim 1, wherein the instructions further include instructions to collect operating data for each of a plurality of components and to identify the action performed by the vehicle user based on the data from each of the plurality of components.

12. The system of claim 1, wherein the instructions further include instructions to retrain the machine learning program with the updated training dataset.

13. A method, comprising:
inputting a signal received from a portable device to a machine learning program trained to output a predicted location of the portable device relative to a vehicle;
collecting operating data of one or more vehicle components;
predicting an action of a vehicle user based on the predicted location; and
based on the predicted action of the vehicle user, actuating one or more vehicle components;
wherein the machine learning program is trained with a training dataset that is updatable to include the signal, the output predicted location, the collected operating data, the predicted action, and an identified action performed by the vehicle user.

14. The method of claim 13, wherein the action performed by the vehicle user is one of an entry into the vehicle, an exit from the vehicle, or an initiation of a propulsion.

15. The method of claim 13, further comprising collecting the operating data from at least one of a vehicle door or a vehicle seat.

16. The method of claim 13, further comprising identifying the location of the portable device as one of a driver entry zone, a passenger entry zone, a vehicle interior, or a rear entry zone.

17. The method of claim 13, further comprising, based on the predicted action of the vehicle user, actuating one or more of the vehicle components to receive input from the vehicle user.

18. The method of claim 13, further comprising annotating the signal with a label including the output predicted location of the portable device.

19. The method of claim 13, further comprising inputting a respective signal strength of a signal sent from the portable device to each of a plurality of receivers to the machine learning program to predict the location of the portable device.

20. The method of claim 13, further comprising retraining the machine learning program with the updated training dataset.

* * * * *